United States Patent
Murphy

(10) Patent No.: US 6,761,846 B2
(45) Date of Patent: Jul. 13, 2004

(54) METHOD OF MAKING GOLF BALLS HAVING A PROTRUSION CENTER

(75) Inventor: Daniel Murphy, Chicopee, MA (US)

(73) Assignee: Callaway Golf Company, Carlsbad, CA (US)

(*) Notice: Subject to any disclaimer, the term of this patent is extended or adjusted under 35 U.S.C. 154(b) by 485 days.

(21) Appl. No.: 09/737,067

(22) Filed: Dec. 14, 2000

(65) Prior Publication Data

US 2003/0001309 A1 Jan. 2, 2003

Related U.S. Application Data

(63) Continuation-in-part of application No. 08/998,243, filed on Dec. 24, 1997, which is a division of application No. 08/920,070, filed on Aug. 26, 1997, now Pat. No. 6,224,498, which is a continuation of application No. 08/542,793, filed on Oct. 13, 1995, now abandoned, which is a continuation-in-part of application No. 08/070,510, filed on Jun. 1, 1993, now abandoned.

(51) Int. Cl.$^7$ .......................... B29C 43/02; B29C 33/40
(52) U.S. Cl. .................. 264/219; 264/255; 264/275; 264/279.1; 425/116; 425/121
(58) Field of Search .................. 264/255, 219, 264/275, 279.1; 425/116, 121

(56) References Cited

U.S. PATENT DOCUMENTS

| D34,557 S | 5/1901 | Cooper |
| 700,656 A | 5/1902 | Kempshall |
| 702,942 A | 6/1902 | Gray |
| 710,753 A | 10/1902 | Cavanagh |
| 716,945 A | 12/1902 | Selzer |
| D60,979 S | 5/1922 | Cigol |
| 1,558,706 A | 10/1925 | Mitzel |
| D91,919 S | 4/1934 | Burbank |
| 4,173,345 A | 11/1979 | Pocklington |
| 4,203,941 A | 5/1980 | Brooker |
| 4,229,401 A | 10/1980 | Pocklington |
| 4,267,217 A | 5/1981 | Brooker |
| D263,491 S | 3/1982 | Surridge |
| 5,692,973 A | 12/1997 | Dalton |
| D393,671 S | 4/1998 | Honaker |
| D396,904 S | 8/1998 | Leu |
| D398,348 S | 9/1998 | Hogan |
| 5,820,485 A | 10/1998 | Hwang |
| 5,827,548 A | 10/1998 | Lavallee et al. |
| D401,365 S | 11/1998 | Liu |
| 5,836,834 A | 11/1998 | Masutani et al. |
| 5,984,807 A | 11/1999 | Wai et al. |
| 6,103,166 A * | 8/2000 | Boehm et al. ............... 264/250 |
| 6,213,897 B1 * | 4/2001 | Masutani ..................... 473/378 |
| 6,508,726 B1 * | 1/2003 | Yamagishi et al. ......... 473/378 |

FOREIGN PATENT DOCUMENTS

JP        98183344        1/2000

OTHER PUBLICATIONS

Machat, U. and Dennis, L., *The Golf Ball Book*, Sport Images, First Edition, First Printing, Sep. 2000, pp. 31, 35, 39, 47, 54, 55, 63, 87, 145.

* cited by examiner

Primary Examiner—Edmund H. Lee

(57) ABSTRACT

The present invention provides a method of making a golf ball with an interior layer having a plurality of outwardly extending protrusions. A plurality of protrusion depressions are machined or otherwise formed on an inner surface of a mold. A center assembly is molded within the mold cavity. The center assembly may be a core comprising a plurality of protrusions on its outer surface or an intermediate layer comprising a plurality of protrusions disposed about a spherical core. A single or multi-layered cover is disposed about the center assembly having the plurality of protrusions.

6 Claims, 10 Drawing Sheets

METHOD OF MAKING GOLF BALLS HAVING A PROTRUSION CENTER

CROSS REFERENCES TO RELATED APPLICATIONS

This is a continuation-in-part application of U.S. application Ser. No. 08/998,243, filed Dec. 24, 1997, which is a division of U.S. application Ser. No. 08/920,070, filed Aug. 26, 1997, which has matured in U.S. Pat. No. 6,224,498, which in turn is a continuation of U.S. application Ser. No. 08/542,793, filed Oct. 13, 1995, now abandoned, which is a continuation-in-part of U.S. application Ser. No. 08/070,510, filed Jun. 1, 1993, now abandoned.

FIELD OF THE INVENTION

This invention generally relates to golf balls, and specifically to golf balls comprising at least one interior layer comprising a plurality of protrusions. In this regard, the present invention concerns an improved process for producing a plurality of protrusions on the surface of an interior layer of a golf ball. Preferably, the plurality of protrusions extend outwardly from an outer surface of a core that is incorporated into a golf ball. The present invention is also directed to the resulting layers and finished golf balls produced utilizing such a process.

BACKGROUND OF THE INVENTION

Traditionally, three types of golf balls are commercially available. The first type of ball available is a one-piece ball which is spherical and made essentially with the same material throughout the ball. The second type of ball available is a wound multi-layered ball having a core, an elastic thread wound about the core, and a cover. The third type of ball available is a non-wound multi-layered ball having at least one core layer and at least one cover layer.

With respect to wound and non-wound multi-layered golf balls, the outer and inner surfaces of the interim layers within the ball typically have a smooth, spherical configuration. Also, each layer of a golf ball typically has a different composition from that of an adjacent layer. Since the layers within a golf ball have different compositions and the various layers each have a spherical configuration, upon striking the ball with a club, the transfer of energy from the outer cover layer to the core is relatively poor. An inefficient transfer, i.e., loss of energy, results in less energy imparted to the ball and thus shorter distance and/or less desirable playing characteristics.

The present invention seeks to improve the transfer of energy in a wound or non-wound multi-layered golf ball by utilizing a new method of forming interior layers of a multi-layered golf ball.

SUMMARY OF THE INVENTION

The present subject matter is directed to a method of making a golf ball comprising the steps of forming a plurality of protrusion depressions on an inner surface of a mold; molding a center assembly having a plurality of outwardly extending protrusions from the mold; and molding a cover about the center assembly having the plurality of outwardly extending protrusions. The center assembly having a plurality of outwardly extending protrusions can be compression molded, injection-molded, reaction injection molded, or pin molded. Preferably, the plurality of protrusion profile depressions formed in the mold are hemispherical, angled, or stepped.

The present subject matter is also directed to a method of making a golf ball comprising the steps of molding a spherical center; machining a plurality of protrusion depressions on a mold; positioning the spherical center within the mold having the plurality of protrusion depressions; molding a mantle layer about the spherical center in the mold to form a center assembly having a plurality of outwardly extending protrusions; and molding a cover layer about the center assembly.

Additionally, the present subject matter is directed to a method of making a golf ball comprising the steps of forming a plurality of protrusion depressions on an inner surface of a mold; molding a center assembly having a plurality of outwardly extending protrusions from the mold; molding a mantle layer about the center assembly having the plurality of outwardly extending protrusions; and molding a cover about the mantle layer to thereby form a golf ball.

Also, the present subject matter is directed to a method of making a golf ball comprising the steps of molding a spherical center; forming a plurality of protrusion depressions on a mold adapted to receive a spherical center; positioning the spherical center within the mold having the plurality of protrusion depressions; molding a mantle layer about the spherical center in the mold having the plurality of protrusion depressions to form a center assembly having a plurality of outwardly extending protrusions; molding an intermediate layer about the center assembly having outwardly extending protrusions; and molding a cover about the intermediate layer to thereby obtain a golf ball.

BRIEF DESCRIPTION OF THE DRAWINGS

The invention may take form in various components and arrangements of components, and in various steps and arrangements of steps. The drawings are only for the purposes of illustrating preferred embodiments and are not to be construed as limiting the invention.

DETAILED DESCRIPTION OF THE PREFERRED EMBODIMENTS

The present invention relates to a method of forming a golf ball having at least one interior layer comprising a plurality of protrusions. Particularly, the interior layer having a plurality of protrusions formed from such a method may be a core layer and/or a mantle layer.

Figure 1A:
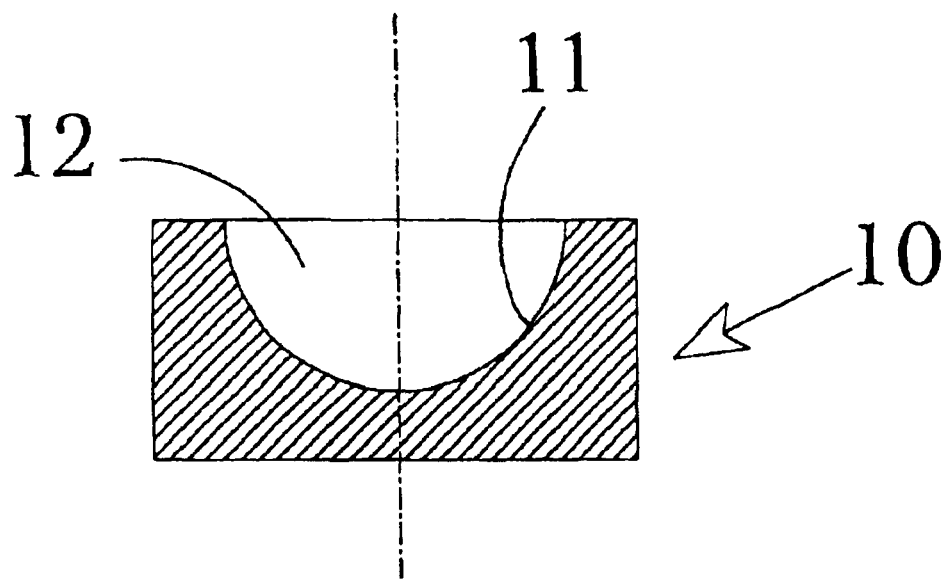
FIG. 1A is a cross-sectional side or elevational view of a golf ball mold prior to machining protrusion depressions in the mold.
Figure 1B:
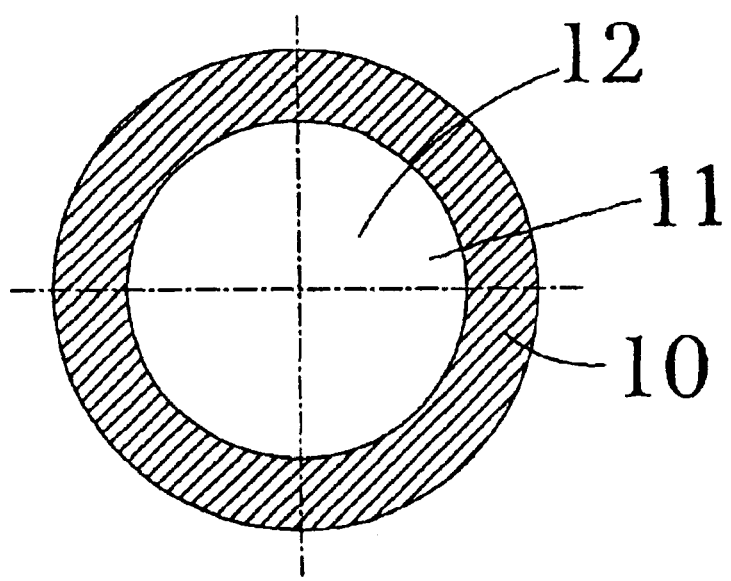
FIG. 1B is a top or planar view of a golf ball mold prior to machining protrusion depressions in the mold.

FIG. 1A shows a cross-sectional view of a conventional golf ball mold 10 with a concave hemispherical surface that defines a cavity 12. FIG. 1B is a top view of the conventional golf ball mold 10 depicted in FIG. 1A. During a typical molding process, two molds 10 are placed together to form a molding cavity within which a golf ball center assembly may be formed (not shown). The center assembly formed from such a process has a spherical shape. The golf ball center assembly formed by the two molds 10 may be a core, a core and core layer disposed about the core, a core and mantle layer disposed about the core, or a core and inner cover layer disposed about the core. The golf ball center assembly may also include any of the noted components in combination with one or more interior layers and/or an inner cover layer.

The golf ball mold 10 as shown in FIGS. 1A and 1B can be any mold known in the art, including but not limited to a compression mold, injection mold, reaction injection mold, or the like.

As shown in FIGS. 1A and 1B, the mold 10 is only capable of forming a spherical center assembly. In the present invention, the mold 10 is modified so that the surface 11 defines a plurality of protrusion depressions so that a center assembly comprising a plurality of outwardly extending protrusions can be formed.

Figure 2:
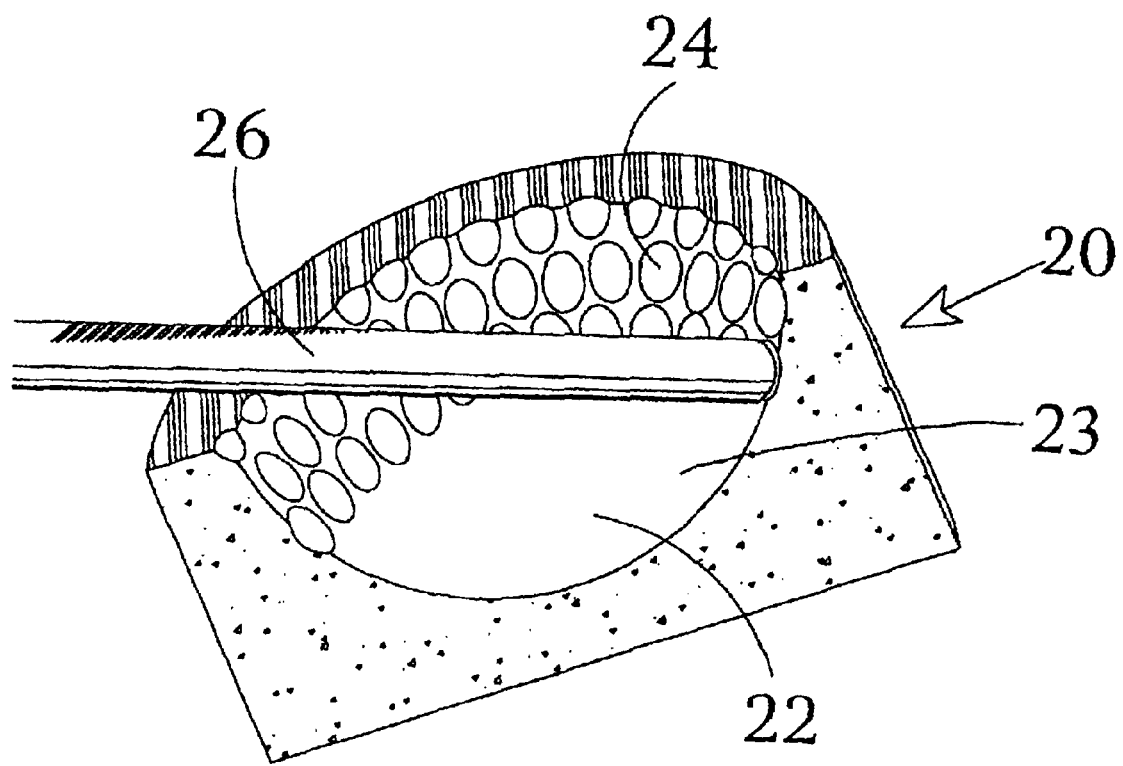
FIG. 2 is a partial cross-sectional perspective view of a mold with a plurality of protrusion depressions being machined on the mold.

FIG. 2 shows a mold 20 having a mold cavity 22 with a plurality of protrusion depressions 24 machined or otherwise formed onto the surface 23 of the mold cavity 22 by a machining tool 26. The mold 20 and/or machining tool 26 is oriented to the desired protrusion depression location. The machining tool 26 then machines a protrusion depression 24 having a desired shape, depth, and width onto the surface 23 of the mold cavity 22. The protrusion depressions 24 may be of equal or different shapes, depths, and widths on the surface 23.

A variety of machining tools may be used to form the protrusion depressions on the mold cavity surface. Particularly, machining tools that may be used include drills, end mills, specially ground cutting tools, and electrical discharge machining (EDM).

Various molding processes can be employed utilizing a mold 20 having a mold cavity 22 comprising a plurality of protrusion depressions 24 as shown in FIG. 2. Molding processes include injection molding, compression molding, transfer molding, or a reaction injection molding process, by utilizing one or more molds having protrusion depressions defined along the molding surfaces. Generally, as described in greater detail herein, the molding surfaces will define a plurality of protrusion depressions.

In a preferred compression molding process, a golf ball center preform is molded and cured under heat and pressure within a molding cavity defined by molding surfaces having a plurality of protrusion depressions formed therein. The volume of the preform placed in the mold cavity is slightly in excess of the actual volume of the mold cavity to cause the cavity to be completely filled when the mold is closed. Thus, an extradite or flash of excess composition is typically expelled at the meeting surfaces of the closed mold assembly. Typically, the composition forming the center preform is compression molded at about 290° F. to about 330° F., preferably at about 315° F., under a pressure of about 100–500 PSI, preferably at about 500 PSI. The time normally required for curing is about 10 minutes to about 20 minutes, preferably about 14 minutes, depending upon the amount and activity of the selected curing agents and any co-agents. After curing, the resulting center assembly is cooled for about 10 minutes by circulating cold water through the mold.

Alternatively, the center assembly may be formed by injection molding. A detailed description regarding injection molds for forming golf balls is disclosed in U.S. Pat. Nos. 5,827,548 and 5,122,046, herein incorporated by reference. In injection molding, a center assembly is formed by injecting a desired material into a mold comprising a plurality of protrusion depressions at 200 to 400° F. for about 2 to 10 minutes.

The center assembly formed by compression molding and injection molding can be a core having a plurality of outwardly extending protrusions on its outer surface, or an intermediate layer having a plurality of outwardly extending protrusions on its outer surface disposed about a cured spherical core. The intermediate layer can be a core layer, mantle layer, or inner cover layer. Preferably, the center assembly formed by compression molding is a core having a plurality of outwardly extending protrusions on its outer surface and the center assembly formed by injection molding is an intermediate layer having a plurality of outwardly extending protrusions on its outer surface disposed about a cured spherical core.

Once the center assembly is molded, a cover layer is molded about the center assembly. The cover disposed about the center assembly can be single or multi-layered. The cover is molded about the center assembly utilizing molding processes which include but are not limited to those currently known in the golf ball art.

After molding a cover about the center assembly to produce a golf ball, the golf balls may undergo various further processing steps such as buffing, painting and marking as disclosed in U.S. Pat. No. 4,911,451, herein incorporated by reference.

Figure 3A:
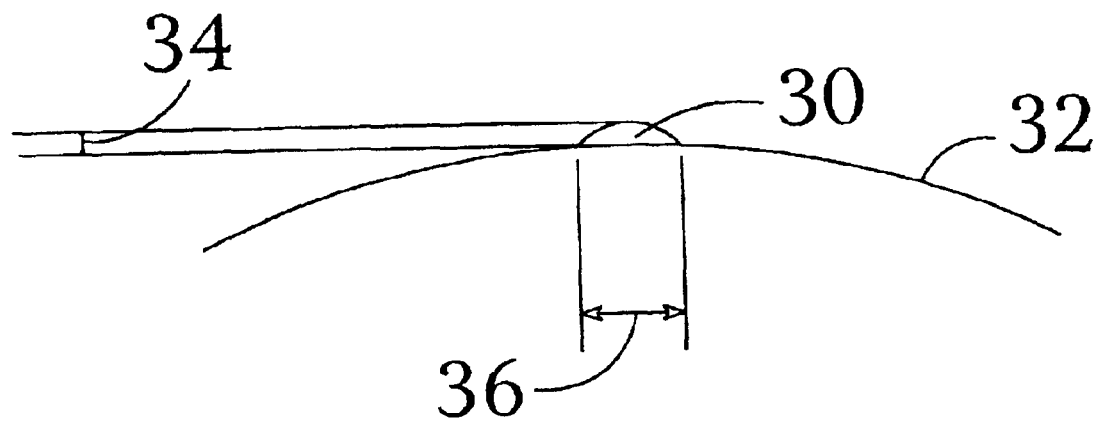
FIG. 3A is an elevational view of a preferred convex-shaped protrusion formed on a center assembly.

Referring to FIG. 3A, a preferred convex protrusion 30 is formed from a mold having a plurality of protrusion depressions machined on its inner surface. The protrusion 30 is located on the outer surface of a golf ball center assembly 32. The height 34 of the convex protrusion 30 can vary depending upon the desired effects to be exhibited in a golf ball incorporating such. Preferably, the height 34 of the convex protrusion 30 is at least about 0.02 inches. More preferably, the height 34 of the convex protrusion 30 is between about 0.02 and 0.06 inches. Most preferably, the height 34 of the convex protrusion 30 is 0.02 inches, 0.04 inches, or 0.06 inches.

The width 36 of the convex protrusion 30 may also vary depending on the height 34 of the protrusion 30. Generally, for a hemispherical protrusion 30, a larger height will require a larger width. Preferably, the width of the convex protrusion is at least about 0.09 inches. More preferably, the width of the convex protrusion is between about 0.09 and 0.18 inches. Most preferably, the width of the convex protrusion is about 0.09 inches when the height is 0.02 inches; 0.16 inches when the height is 0.04 inches; and 0.179 inches when the height is 0.06 inches. It will be understood however, that the configuration and geometry of protrusions according to the present invention may vary from these preferred dimensions.

Figure 3B:
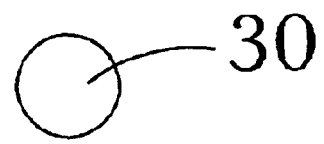
FIG. 3B is a top view of a preferred convex-shaped protrusion.

FIG. 3B shows the top view of the convex protrusion 30 formed from the method of the present invention. The protrusion 30 has a circular shape when viewed from the top. As previously noted, it will be understood that the present invention includes a wide variety of other shapes and configurations for protrusions besides circular.

Figure 4:
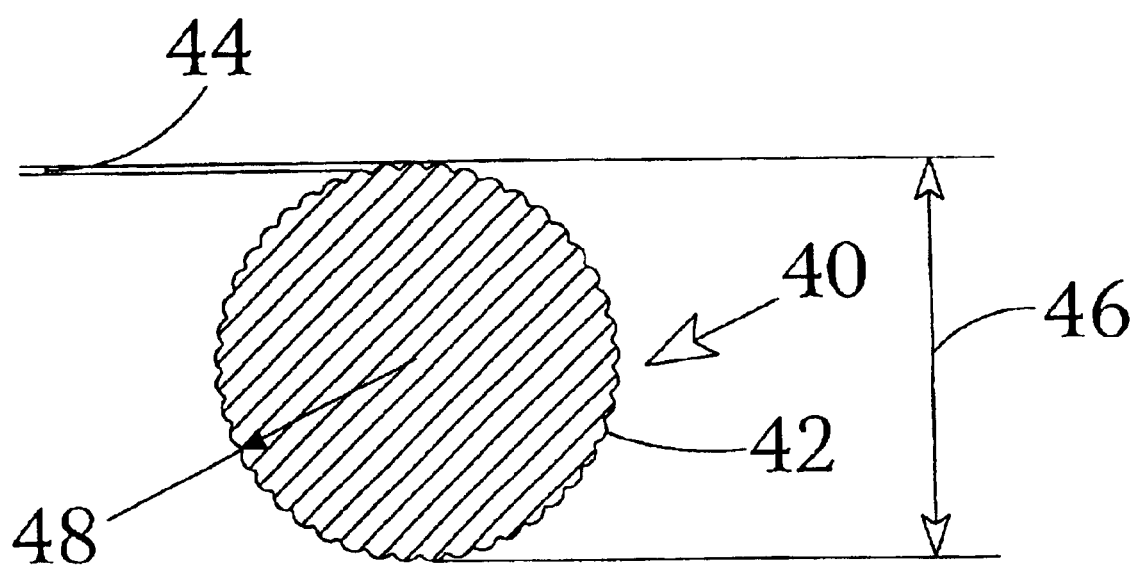
FIG. 4 is a cross-sectional elevational view of a golf ball center assembly having a plurality of preferred convex protrusions.

A center assembly comprising a plurality of outwardly extending protrusions on its outer surface may be a core having protrusions on its outer surface or an intermediate layer having protrusions on its outer surface disposed about a spherical core. Referring to FIG. 4, a center assembly 40 has a plurality of outwardly extending protrusions 42 on its outer surface. The center assembly 40 is a single-layered core. The plurality of protrusions 42 have a particular height 44. The height of the protrusions on the outer surface of the center assembly 40 may be equal to or different from one another. Preferably, the heights 44 of the plurality of protrusions 42 are all of equal dimension.

The center assembly 40 has a diameter 46 measured from the apex of one protrusion to the apex of a protrusion opposite from the first apex protrusion. Preferably the diameter of the center assembly 40 is within the range of from about 1.50 to about 1.60 inches. Most preferably, the diameter of the center assembly 40 is about 1.546 inches. The center assembly 40 also has a radius 48 measured from the center of the center assembly to the edge of the center assembly at a point between two protrusions. Preferably, the radius is between about 0.713 and 0.753 inches. The height of a protrusion can be calculated by subtracting the radius 48, which has been multiplied by two, from the diameter 46 and dividing by two, assuming that all of the protrusion heights on the outer surface of the center assembly are of equal length.

Figure 5:
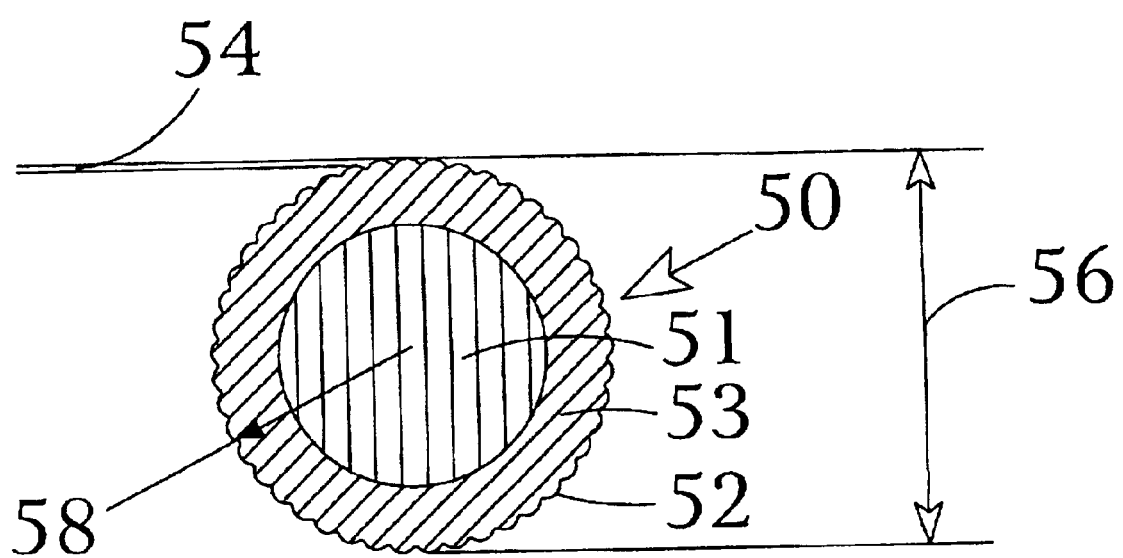
FIG. 5 is a cross-sectional elevational view of an alternate embodiment golf ball center assembly having a plurality of preferred convex protrusions.

In an alternate embodiment, FIG. 5 shows a center assembly 50 having a spherical core 51 and an intermediate layer 53 disposed about the spherical core 51. The intermediate layer 53 has a plurality of protrusions 52 on its outer surface.

The intermediate layer 53 may be a core layer having the same or similar composition to the spherical core 51. Alternatively, the intermediate layer 53 may be an inner cover layer having a similar or same composition as a golf ball cover. The intermediate layer may comprise a composition different from either the core or cover. Furthermore, the intermediate layer 53 may be a mantle layer having the same or similar composition as the core or as the cover layer. In this regard, the cover layer could include a plurality of layers such as an inner cover layer and an outer cover layer, either or both of which could be similar in composition to the intermediate layer.

The plurality of protrusions 52 each have a particular height 54. The height of each particular protrusion may be equal or different. Preferably, the heights of the plurality of protrusions are equal.

The center assembly 50 has a diameter 56 measured from the apex of a first protrusion in a straight line across the center of the center assembly 50 to the apex of a second protrusion opposite the first protrusion. Preferably, the diameter 56 ranges from about 1.50 inches to about 1.60 inches and most preferably is about 1.546 inches.

The center assembly 50 also has a radius 58 measured from the center of the center assembly 50 to the outer surface of the center assembly 50 between two protrusions. Preferably, the radius 58 is between about 0.713 and 0.753 inches.

The height of a protrusion can be calculated by subtracting the radius 58, after having been multiplied by two, from the diameter 56 and dividing by two, assuming that all of the protrusion heights on the outer surface of the center assembly 50 are of equal length.

Figure 6A:
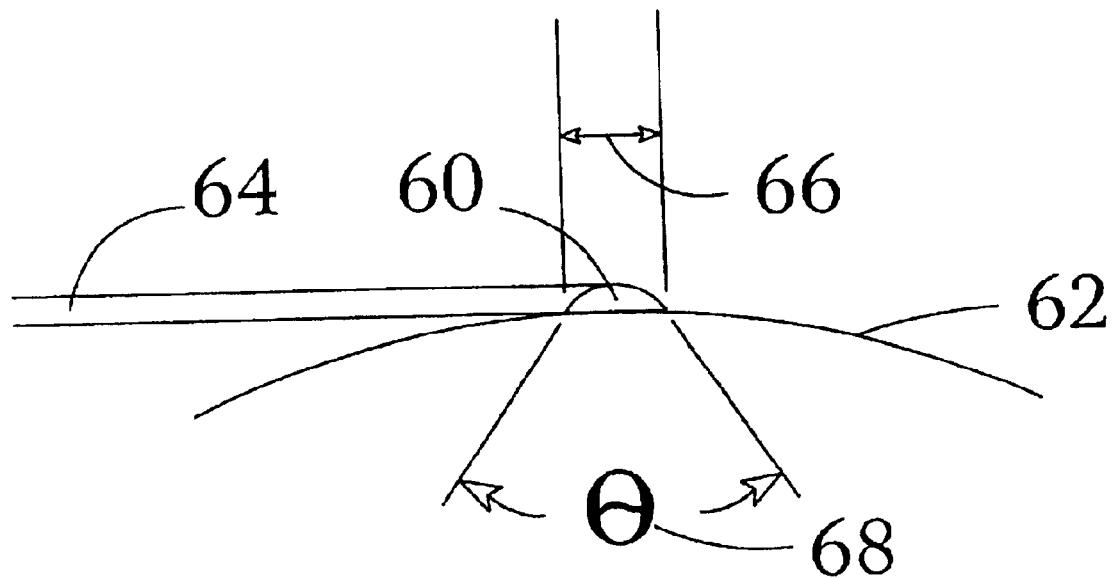
FIG. 6A is an elevational view of a preferred angled protrusion on a golf ball center assembly.
Figure 6B:
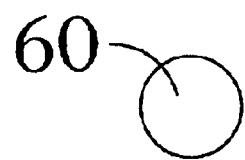
FIG. 6B is a top view of a preferred angled protrusion on a golf ball assembly.

Referring to FIG. 6A, a preferred angled protrusion 60 is disposed on the outer surface of the center assembly 62. The angled protrusion 60 may have a variety of heights 64. Also, the angled protrusion 60 may have a variety of widths 66 and angles 68 depending on the desired height of the angled protrusion 60. FIG. 6B shows a top view of the angled protrusion 60.

The preferred angled protrusion 60 formed from the present invention molding process may have various heights 64. The heights of the preferred angled protrusion may vary depending upon the particular characteristics desired in a golf ball by an artisan. Preferably, the height of the angled protrusion is at least 0.02 inches. More preferably, the height of the angled protrusion is between about 0.02 and 0.06 inches. Most preferably, the height of the angled protrusion is 0.02 inches, 0.04 inches, or 0.06 inches.

Additionally, the preferred angled protrusion 60 may have a variety of different widths 66 and angles 68. The width 66 varies depending upon the desired height 64. Preferably, the width 66 of the preferred angled protrusion 60 is between about 0.09 and 0.18 inches. The angle 68 varies depending upon the desired height 64 and width 66. Preferably, the angle 68 is less than 180°. Most preferably, when the height 64 of the angled protrusion 60 is 0.04 inches, and the width 66 is 0.160 inches, the angle 68 is 107.1°; when the height 64 is 0.06 inches and the width 66 is maintained at 0.160 inches, the angle 68 is 76.6°. It will be understood that the foregoing dimensions and angles are merely those that are preferred. The present invention encompasses the use of a wide variety of widths and angles for a protrusion or plurality of protrusions.

Figure 7:
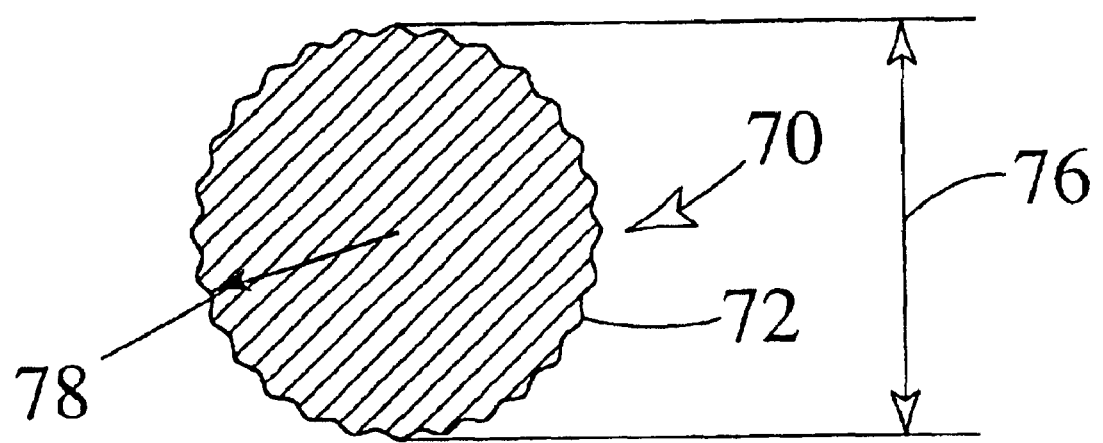
FIG. 7 is a cross-sectional elevational view of a golf ball center assembly having a plurality of preferred angled protrusions.

FIG. 7 illustrates a center assembly 70 having a plurality of angled protrusions 72. The plurality of angled protrusions 72 have a height as previously described. Generally, the height of an angled protrusion is the distance from an apex or outermost tip of a protrusion, to the base of the protrusion or the lowermost point in the region between protrusions. That distance is measured along a line extending radially outward from the center point of the assembly 70. The heights of the angled protrusions on the outer surface of the center assembly may be equal or unequal. Preferably, the heights on the outer surface are equal.

The diameter 76 of the center assembly 70 is measured in a straight line from the apex of one protrusion 72 across the center of the center assembly 70 to the apex of another protrusion 72 at an end opposite the first protrusion. Preferably, the diameter 76 ranges from about 1.50 inches to about 1.60 inches and most preferably is about 1.546 inches. The radius 78 of the center assembly 70 is measured from the center of the center assembly 70 to a point on the end of the center assembly 70 between two protrusions 72. The preferred radius 78 is between about 0.713 and 0.753 inches. The difference between the diameter 76 and two times the radius 78 is equal the depth of two protrusions, assuming that all of the protrusions on the center assembly 70 are of equal height.

Figure 8:
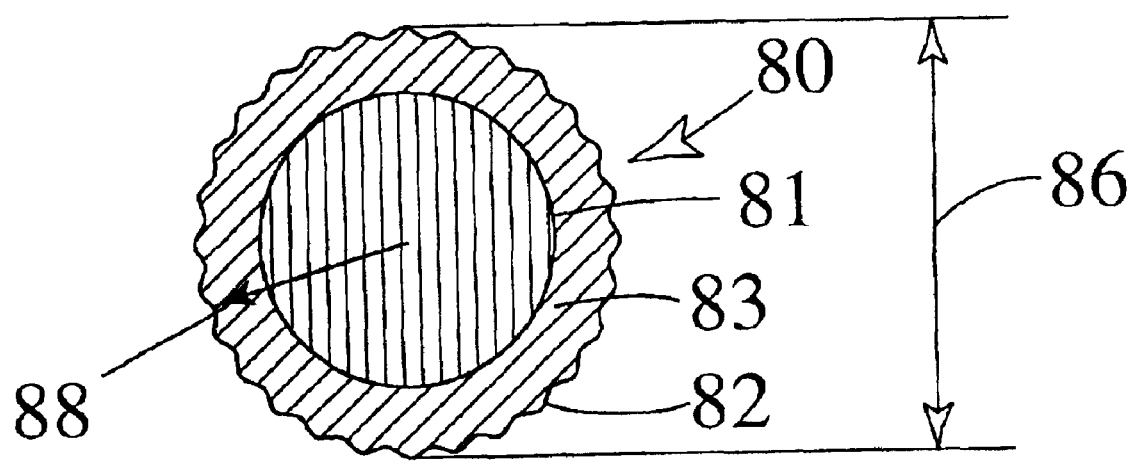
FIG. 8 is a cross-sectional elevational view of an alternate embodiment golf ball center assembly having a plurality of preferred angled protrusions.

In an alternate embodiment, FIG. 8 shows a center assembly 80 having a spherical core 81 and a plurality of preferred angled protrusions 82 on the outer surface of an intermediate layer 83 disposed about the spherical core 81. The plurality of preferred angled protrusions 82 have a height as previously described, with respect to the embodiment illustrated in FIG. 7. A diameter 86 of the center assembly 80 is measured from the apex of one protrusion in a straight line across the center of the center assembly 80 to the apex of a second protrusion opposite from the first protrusion. Preferably, the diameter 86 is about 1.546 inches. A radius 88 is measured from the center of the center assembly 80 to a point at the outer surface of the center assembly 80 between two protrusions 82. The preferred radius is between about 0.713 and 0.753 inches. The height of a protrusion can be obtained by subtracting the diameter 86 from two times the radius 88 and dividing by two, assuming that all of the heights of the protrusions are equal.

Figure 9A:
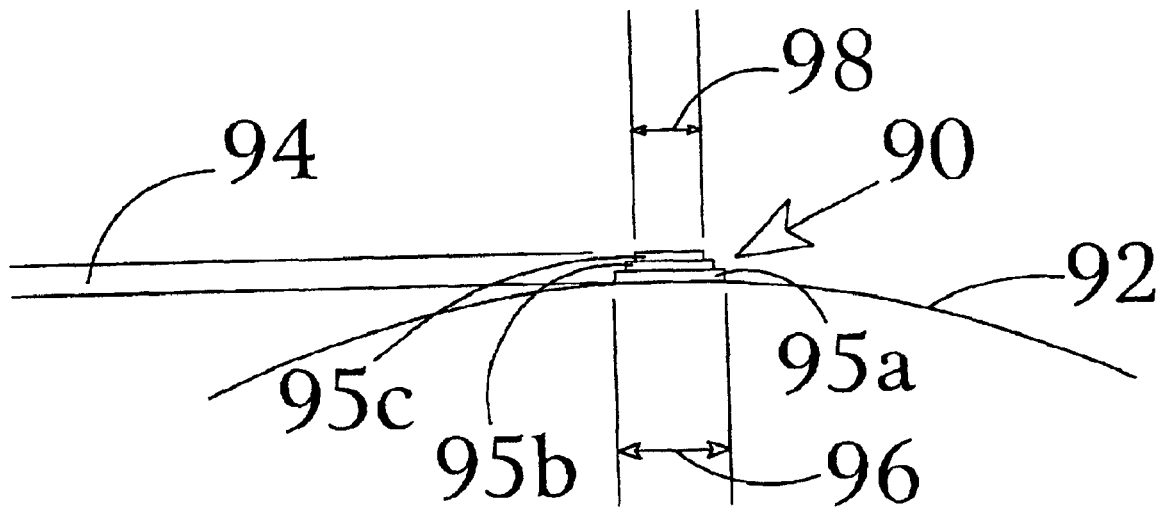
FIG. 9A is an elevational view of a preferred stepped protrusion on a golf ball center assembly.

Referring to FIG. 9A, a preferred stepped protrusion 90 can be formed on the center assembly 92 using the present invention molding process. The stepped protrusion 90 has various heights 94.

Figure 9B:
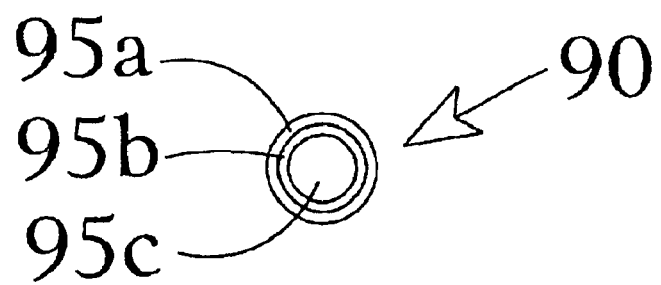
FIG. 9B is a top view of a preferred stepped protrusion.

The stepped protrusion 90 has at least one step and can vary in the number of steps. FIG. 9A shows a stepped protrusion 90 having three steps 95a, 95b, 95c. However, the number of steps 95 may vary depending upon the height 94 and width 96 desired. FIG. 9B shows a top view of the preferred stepped protrusion 90 having three steps 95a, 95b, 95c.

The width of each step 95a, 95b, 95c varies. Preferably step 95a which abuts or is disposed immediately adjacent to or upon the center assembly 92 has the largest width while step 95c which is the step furthest away from the center assembly 92 has the smallest width 98.

Figure 10A:
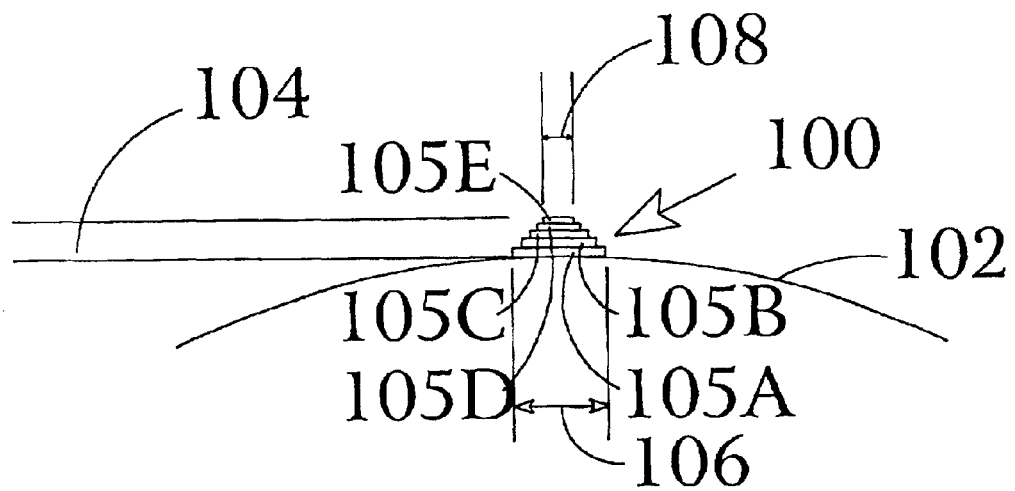
FIG. 10A is an elevational view of another preferred stepped protrusion on a golf ball center assembly.
Figure 10B:
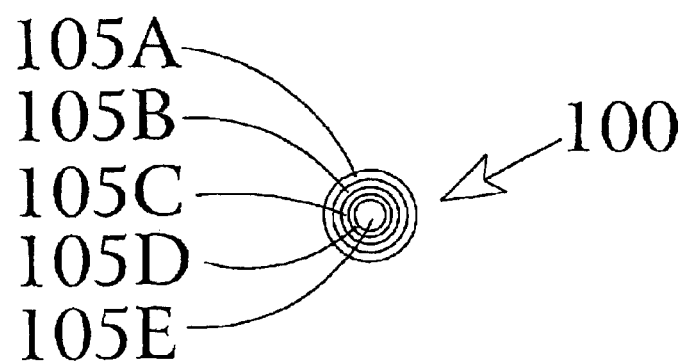
FIG. 10B is a top view of another preferred stepped protrusion on a golf ball center assembly.

FIG. 10A shows another preferred stepped protrusion 100. The stepped protrusion 100 is formed using the above molding method so that it is formed on a center assembly 102. The stepped protrusion 100 may vary in height 104. The stepped protrusion 100 has five steps 105a, 105b, 105c, 105d, 105e with step 105a abutting the center assembly 102 having the greatest width 106 and each step extending outwardly away from the center assembly 102 having a smaller width and step 105e having the smallest width 108. FIG. 10B shows a top view of the stepped protrusion 100 having steps 105a, 105b, 105c, 105d, 105e.

The preferred stepped protrusion as shown in FIGS. 9A and 10A can have various heights. The height of the stepped protrusion is measured from the end of the step furthest from the center assembly in a straight line to the point on the center assembly where the center assembly would be spherical. Preferably, the height of the stepped protrusion is at least about 0.02 inches. More preferably, the height of the stepped protrusion is between about 0.02 and 0.06 inches. Most preferably, the stepped protrusion is 0.02 inches, 0.04 inches, or 0.06 inches in height.

The stepped protrusion has at least one step. In FIG. 9A, the preferred stepped protrusion 90 has three steps 95a, 95b, 95c. In FIG. 10A, the preferred stepped protrusion 100 has five steps 115a, 115b, 115c, 115d, 115e. The mold of the present invention method can be machined with any number of steps in forming the protrusion depression. When the preferred stepped protrusion has two or more steps, each step may be of equal or different heights from one another. Preferably, each step has an equal height.

Moreover, when the preferred protrusion profile comprises two or more steps, the width of each step varies. Preferably, the step abutting the center assembly has the largest width and the width of each step extending outwardly decreases so that the step furthest away from the center assembly has the smallest width. The decreasing width of each step extending outwardly may be of equal or unequal proportion. Preferably, the width of each step extending outwardly from the spherical center decreases equally.

The shapes of the steps of the preferred stepped protrusion may vary. As shown in FIGS. 9B and 10B, each step as shown from the top view, i.e., the side facing away from the center assembly, has a circular shape. However, a step may have other shapes from the top side including ovals, triangles, rectangles, and any other geometric shape. Preferably, the bottom side of the steps, i.e., side opposite of the top side, has a shape similar to the shape of the top side.

The sides of the stepped protrusion perpendicular to the top and bottom sides can vary in shape and configuration. As shown in FIGS. 9A and 10A, the sides of the stepped protrusion perpendicular to the top and bottom side have a rectangular shape. However, the sides of the stepped protrusion perpendicular to the top and bottom side may have tapered corners instead of right angled corners or may have other shapes such as a curved (i.e. elliptical) shape.

Each step of the preferred stepped protrusion may have equal or different shapes from one another. Preferably, each step has an equal shape.

In one most preferred embodiment, FIG. 9A shows a preferred stepped protrusion 90 on a center assembly 92 having three steps 95a, 95b, 95c. The depth 94 of the preferred stepped protrusion 90 is 0.04 inches. Step 95a has width of 0.096 inches. Step 95b has a width of 0.078 inches. Step 95c has a width of 0.06 inches. The width of each outwardly extending step decreases by 0.018 inches. Steps 95a, 95b, 95c each have a height of about 0.013 inches for a total of about 0.04 inches.

In another most preferred embodiment, FIG. 10A shows a preferred stepped protrusion 100 having five steps, 105a, 105b, 105c, 105d, 105e. The total height 104 is 0.06 inches. The width 106 of step 105a is 0.123 inches and the width 108 of step 105e is 0.063 inches. The width of steps 105a, 105b, 105c, 105d, 105e increases incrementally from step 105a to 105e by 0.015 inches so that the width of 105b is 0.078 inches, 105c is 0.093 inches, and 105d is 0.108 inches. The height of steps 105a, 105b, 105c, 105d, 105e are each 0.012 inches so that the height totals 0.06 inches.

The compositions of the core or center assembly may be based on polybutadiene, natural rubber, metallocene catalyzed polyolefins such as EXACT® (Exxon Chemical Co.) and ENGAGE® (DOW Chemical Co.), and mixtures of one or more of the above materials with each other and/or with other elastomers. The core may be formed from a uniform composition or may be a dual or multi-layer core. The core may be foamed or unfoamed. It is preferred that the base elastomer have a relatively high molecular weight. Polybutadiene has been found to be particularly useful because it imparts to the golf balls a relatively high coefficient of restitution. Polybutadiene can be cured using a free radical initiator such as peroxide, or can be sulfur cured. A broad range for the molecular weight of preferred base elastomers is from about 50,000 to about 500,000. A more preferred range for the molecular weight of the base elastomer is from about 100,000 to about 500,000. As a base elastomer for the core composition, cis-1-4-polybutadiene is preferably employed, or a blend of cis-1-4-polybutadiene with other elastomers may also be utilized. Most preferably, cis-1-4-polybutadiene having a weight-average molecular weight of from about 100,000 to about 500,000 is employed. Along this line, it has been found that the high cis-1-4-polybutadienes manufactured and sold by Bayer Corp., Germany, under the trade name Taktene® 220 or 1220 are particularly preferred. Furthermore, the core may be comprised of a cross linked natural rubber, ethylene propylene diene rubber (EPDM), metallocene catalyzed polyolefin, or another crosslinkable elastomer.

When polybutadiene is used for golf ball cores, it commonly is cross linked with an unsaturated carboxylic acid co-cross linking agent. The unsaturated carboxylic acid component of the core composition typically is the reaction product of the selected carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the core compositions are acrylic acid, methacrylic acid, itaconic acid, crotonic acid, sorbic acid, and the like, and mixtures thereof. Preferably, the acid component is either acrylic or methacrylic acid. Usually, from about 5 to about 40, and preferably from about 15 to about 30 parts by weight of the carboxylic acid salt, such as zinc diacrylate, is included in the core composition. The unsaturated carboxylic acids and metal salts thereof are generally soluble in the elastomeric base, or are readily dispersible.

The free radical initiator included in the core composition is any known polymerization initiator (a co-cross linking agent) which decomposes during the cure cycle. The term "free radical initiator" as used herein refers to a chemical which, when added to a mixture of the elastomeric blend and a metal salt of an unsaturated, carboxylic acid, promotes cross linking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bis (butylperoxy) valerate, 1,1-bis (t-butylperoxy)-3,3,5-trimethyl cylcohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercially available peroxides are Luperco® 230 or 231 XL sold by Atochem, Lucidol Division, Buffalo, N.Y., and Trigonox® 17/40 sold by Akzo Chemicals, America, Chicago, Ill. In this regard Lupercoe 230 XL and Trigonox® 29/40 are comprised of 1,1-bis(t-butylperoxy-3,3,5-trimethyl cyclohexane). The one hour half life of Luperc® 231 XL is about 112° C., and the one hour half life of Trigonox® 29/40 is about 129° C.

The core compositions of the present invention may additionally contain any other suitable and compatible modifying ingredients including, but not limited to, metal oxides, fatty acids, and diisocyanates and polypropylene powder resin. For example, PAPI® 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger. In addition, it has been found that the addition of a polypropylene powder resin results in a core which is hard (i.e. exhibits high PGA compression) and thus allows for a reduction in the amount of cross linking co-agent utilized to soften the core to a normal or below normal compression.

Furthermore, because polypropylene powder resin can be added to a core composition without an increase in weight of the molded core upon curing, the addition of the polypropylene powder allows for the addition of higher specific gravity fillers, such as mineral fillers. Since the cross linking agents utilized in the polybutadiene core compositions are expensive and/or the higher specific gravity fillers are relatively inexpensive, the addition of the polypropylene powder resin substantially lowers the cost of the golf ball cores while maintaining, or lowering, weight and compression.

The polypropylene ($C_3H_5$) powder suitable for use in the present invention has a specific gravity of about 0.90 g/cm$^3$, a melt flow rate of about 4 to about 12 and a particle size distribution of greater than 99% through a 20 mesh screen. Examples of such polypropylene powder resins include those sold by the Amoco Chemical Co., Chicago, Ill., under the designations "6400 P", "7000 P" and "7200 P". Generally, from 0 to about 25 parts by weight polypropylene powder per each 100 parts of elastomer are included in the present invention.

Various activators may also be included in the compositions of the present invention. For example, zinc oxide and/or magnesium oxide are activators for the polybutadiene. The activator can range from about 2 to about 20 parts by weight per 100 parts by weight of the rubbers (phr) component.

Moreover, reinforcement agents may be added to the core compositions of the present invention. Since the specific gravity of polypropylene powder is very low, and when compounded, the polypropylene powder produces a lighter molded core, when polypropylene is incorporated in the core compositions, relatively large amounts of higher specific gravity fillers may be added so long as the specific core weight limitations are met. As indicated above, additional benefits may be obtained by the incorporation of relatively large amounts of higher specific gravity, inexpensive mineral fillers such as calcium carbonate. Such fillers as are incorporated into the core compositions should be in finely divided form, as for example, in a size generally less than about 30 mesh and preferably less than about 100 mesh U.S. standard size. The amount of additional filler included in the core composition is primarily dictated by weight restrictions and preferably is included in amounts of from about 10 to about 100 parts by weight per 100 parts rubber.

The preferred fillers are relatively inexpensive and heavy and serve to lower the cost of the ball and to increase the weight of the ball to closely approach the U.S.G.A. weight limit of 1.620 ounces. However, if thicker cover compositions are to be applied to the core to produce larger than normal (i.e. greater than 1.680 inches in diameter) balls, use of such fillers and modifying agents will be limited in order to meet the U.S.G.A. maximum weight limitations of 1.620 ounces.

Limestone is ground calcium/magnesium carbonate and is used because it is an inexpensive, heavy filler. Ground flash filler may be incorporated and is preferably 20 mesh ground up center stock from the excess flash from compression molding. It lowers the cost and may increase the hardness of the ball.

Fatty acids or metallic salts of fatty acids may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid and linoleic acids, as well as mixtures thereof. Exemplary of suitable metallic salts of fatty acids include zinc stearate. When included in the core compositions, the metallic salts of fatty acids are present in amounts of from about 1 to about 25, preferably in amounts from about 2 to about 15 parts by weight based on 100 parts rubber (elastomer). It is preferred that the core compositions include stearic acid as the fatty acid adjunct in an amount of from about 2 to about 5 parts by weight per 100 parts of rubber.

Diisocyanates may also be optionally included in the core compositions. When utilized, the diisocyanates are included in amounts of from about 0.2 to about 5.0 parts by weight based on 100 parts rubber. Exemplary of suitable diisocyanates are 4,4'-diphenylmethane diisocyanate and other polyfunctional isocyanates known to the art.

Furthermore, the dialkyl in difatty acids set forth in U.S. Pat. No. 4,844,471, the dispensing agents disclosed in U.S. Pat. No. 4,838,556, and the dithiocarbamates set forth in U.S. Pat. No. 4,852,884 may also be incorporated into the polybutadiene compositions of the present invention. The specific types and amounts of such additives are set forth in the above identified patents, which are incorporated herein by reference.

The core compositions of the invention which contain polybutadiene are generally comprised of 100 parts by weight of a base elastomer (or rubber) selected from polybutadiene and mixtures of polybutadiene with other elastomers, 15 to 25 parts by weight of at least one metallic salt of an unsaturated carboxylic acid, and 0.5 to 10 parts by weight of a free radical initiator.

As indicated above, additional suitable and compatible modifying agents such as particulate polypropylene resin, fatty acids, and secondary additives such as pecan shell flour, ground flash (i.e. grindings from previously manufactured cores of substantially identical construction), barium sulfate, zinc oxide, etc. may be added to the core compositions to adjust the weight of the ball as necessary in order to have the finished molded ball (core, cover and coatings) closely approach the U.S.G.A. weight limit of 1.620 ounces.

In producing solid golf ball cores utilizing the present compositions, the ingredients may be intimately mixed using, for example, two roll mills or an internal mixer until the composition is uniform, usually over a period of from about 5 to about 20 minutes. The sequence of addition of components is not critical. A preferred blending sequence is as follows.

The elastomer, polypropylene powder resin (if desired), fillers, zinc salt, metal oxide, fatty acid, and the metallic dithiocarbamate (if desired), surfactant (if desired), and tin difatty acid (if desired), are blended for about 7 minutes in an internal mixer such as a Banbury® (Farrel Corp.) mixer. As a result of shear during mixing, the temperature rises to about 200° F. The initiator and diisocyanate are then added and the mixing continued until the temperature reaches about 220° F. whereupon the batch is discharged onto a two roll mill, mixed for about one minute and sheeted out.

The sheet is rolled into a "pig" and then placed in a Barwell™ preformer and slugs are produced. The slugs are then subjected to compression molding at about 320° F. for about 14 minutes. After molding, the molded cores are cooled, the cooling effected at room temperature for about 4 hours or in cold water for about one hour. The molded cores can be subjected to a centerless grinding operation whereby a thin layer of the molded core is removed to produce a round core having a diameter or 1.2 to 1.5 inches. The cores can now be used in the as-molded state with no grinding needed to achieve roundness.

The mixing is desirably conducted in such a manner that the composition does not reach incipient polymerization temperatures during the blending of the various components.

Usually the curable component of the composition will be cured by heating the composition at elevated temperatures on the order of from about 275° F. to about 350° F., preferably and usually from about 290° F. to about 325° F.

Alternatively, the core composition can be molded as described herein if it is desired that the core formed has a plurality of protrusions on its outer surface.

After molding, the core is removed from the mold and the surface thereof optionally is treated to facilitate adhesion thereof to the covering materials. Surface treatment can be effected by any of the several techniques known in the art, such as corona discharge, ozone treatment, sand blasting, and the like. Preferably, surface treatment is effected by grinding with an abrasive wheel.

Various covers known in the art can be formed about the center assembly formed from the present invention method. Particularly, the cover may be single or multi-layered. Multi-layered covers include a first or inner layer or ply of a high acid (greater than 16 weight percent acid) ionomer or ionomer blend and second or outer layer or ply comprised of a comparatively softer, low modulus ionomer, ionomer blend or other non-ionomeric thermoplastic elastomer such as polyurethane, a polyester elastomer such as Hytrel® polyester elastomer of E. I. DuPont de Nemours & Company, or a polyether such as the Elf Atochem S.A. Pebax® polyetheramide. Preferably, the outer cover layer includes a blend of hard and soft low acid (i.e. 16 weight percent acid or less) ionomers. It has been found that the recently developed high acid ionomer based inner layer, provides for a substantial increase in resilience (i.e., enhanced distance) over known multi-layer covered balls.

The softer outer layer provides for desirable "feel" and high spin rate while maintaining respectable resiliency. The soft outer layer allows the cover to deform more during impact and increases the area of contact between the club face and the cover, thereby imparting more spin on the ball. As a result, the soft cover provides the ball with a balata-like feel and playability characteristics with improved distance and durability. Consequently, the overall combination of the inner and outer cover layers results in a golf ball having enhanced resilience (improved travel distance) and durability (i.e. cut resistance, etc.) characteristics while maintaining and in many instances, improving the ball's playability properties.

The combination of a high acid ionomer or ionomer blend inner cover layer with a soft, relatively low modulus ionomer, ionomer blend or other non-ionomeric thermoplastic elastomer outer cover layer provides for excellent overall coefficient of restitution (i.e., excellent resilience) because of the improved resiliency produced by the inner cover layer. While some improvement in resiliency is also produced by the outer cover layer, the outer cover layer generally provides for a more desirable feel and high spin, particularly at lower swing speeds with highly lofted clubs such as half wedge shots.

The inner layer compositions include the high acid ionomers such as those recently developed by E. I. DuPont de Nemours & Company under the trademark "Surlyn®" and by Exxon Corporation under the trademark "Escor®" or tradename "Iotek", or blends thereof. Examples of compositions which may be used as the inner layer herein are set forth in detail in U.S. Pat. No. 5,688,869, incorporated herein by reference. Of course, the inner layer high acid ionomer compositions are not limited in any way to those compositions set forth in that '869 patent. For example, the high acid ionomer resins recently developed by Spalding & Evenflo Companies, Inc., the assignee of the present invention, and disclosed in the '869 patent, may also be utilized to produce the inner layer of the multi-layer cover used in the present invention.

The high acid ionomers which may be suitable for use in formulating the inner layer compositions of the subject invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–75%, preferably 30–70%) by the metal ions. Each of the high acid ionomer resins which may be included in the inner layer cover compositions of the invention contains greater than about 16% by weight of a carboxylic acid, preferably from about 17% to about 25% by weight of a carboxylic acid, more preferably from about 18.5% to about 21.5% by weight of a carboxylic acid.

Although the inner layer cover composition preferably includes a high acid ionomeric resin and the scope of the patent embraces all known high acid ionomeric resins falling within the parameters set forth above, only a relatively limited number of these high acid ionomeric resins have recently become commercially available.

The high acid ionomeric resins available from Exxon under the designation "Escor®" and or "Iotek", are somewhat similar to the high acid ionomeric resins available under the "Surlyn®" trademark. However, since the Escor®/Iotek ionomeric resins are sodium or zinc salts of poly (ethylene-acrylic acid) and the "Surlyn®" resins are zinc, sodium, magnesium, etc. salts of poly(ethylene-methacrylic acid), distinct differences in properties exist.

Examples of the high acid methacrylic acid based ionomers found suitable for use in accordance with this invention include Surlyn® AD-8422 (sodium cation), Surlyn® 8162 (zinc cation), Surlyn® SEP-503-1 (zinc cation), and Surlyn® SEP-503-2 (magnesium cation). According to DuPont, all of these ionomers contain from about 18.5 to about 21.5% by weight methacrylic acid.

More particularly, Surlyn® AD-8422 is currently commercially available from DuPont in a number of different grades (i.e., AD-8422-2, AD-8422-3, AD-8422-5, etc.) based upon differences in melt index. According to DuPont, Surlyn® AD-8422 offers the following general properties when compared to Surlyn® 8920, the stiffest, hardest of all on the low acid grades (referred to as "hard" ionomers in U.S. Pat. No. 4,884,814):

|  | LOW ACID (15 wt % Acid) | HIGH ACID (>20 wt % Acid) | |
|---|---|---|---|
|  | SURLYN® 8920 | SURLYN® 8422-2 | SURLYN® 8422-3 |
| IONOMER |  |  |  |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| MP[1], ° C. | 88 | 86 | 85 |
| FP[1], ° C. | 47 | 48.5 | 45 |
| COMPRESSION MOLDING[2] |  |  |  |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

[1]DSC second heat, 10° C./min heating rate.
[2]Samples compression molded at 150° C. annealed 24 hours at 60° C. 8422-2, -3 were homogenized at 190° C. before molding.

In comparing Surlyn® 8920 to Surlyn® 8422-2 and Surlyn® 8422-3, it is noted that the high acid Surlyn® 8422-2 and 8422-3 ionomers have a higher tensile yield, lower elongation, slightly higher Shore D hardness and much higher flexural modulus. Surlyn® 8920 contains 15 weight percent methacrylic acid and is 59% neutralized with sodium.

In addition, Surlyn® SEP-503-1 (zinc cation) and Surlyn® SEP-503-2 (magnesium cation) are high acid zinc and magnesium versions of the Surlyn® AD 8422 high acid ionomers. When compared to the Surlyn® AD 8422 high acid ionomers, the Surlyn SEP-503-1 and SEP-503-2 ionomers can be defined as follows:

| Surlyn® Ionomer | Ion | Melt Index | Neutralization % |
|---|---|---|---|
| AD 8422-3 | Na | 1.0 | 45 |
| SEP 503-1 | Zn | 0.8 | 38 |
| SEP 503-2 | Mg | 1.8 | 43 |

Furthermore, Surlyn® 8162 is a zinc cation ionomer resin containing approximately 20% by weight (i.e. 18.5–21.5% weight) methacrylic acid copolymer that has been 30–70% neutralized. Surlyn® 8162 is currently commercially available from DuPont.

Examples of the high acid acrylic acid based ionomers suitable for use in the present invention also include the Escor® or Iotek high acid ethylene acrylic acid ionomers produced by Exxon. In this regard, Escor® or Iotek 959 is a sodium ion neutralized ethylene-acrylic neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions, respectively. The physical properties of these high acid acrylic acid based ionomers are as follows:

| PROPERTY | ESCOR® (IOTEK) 959 | ESCOR® (IOTEK) 960 |
|---|---|---|
| Melt Index, g/10 min | 2.0 | 1.8 |
| Cation | Sodium | Zinc |
| Melting Point, ° F. | 172 | 174 |
| Vicat Softening Point, ° F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 66,000 | 27,000 |

Furthermore, as a result of the development of a number of new high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. It has been found that these new cation neutralized high acid ionomer blends produce inner cover layer compositions exhibiting enhanced hardness and resilience due to synergies which occur during processing. Consequently, the metal cation neutralized high acid ionomer resins recently produced can be blended to produce substantially harder inner cover layers for multi-layered golf balls having higher C.O.R.'s than those produced by the low acid ionomer inner cover compositions presently commercially available.

More particularly, several new metal cation neutralized high acid ionomer resins have been produced by neutralizing, to various extents, high acid copolymers of an alpha-olefin and an alpha, beta-unsaturated carboxylic acid with a wide variety of different metal cation salts. This discovery is the subject matter of U.S. Pat. No. 5,688,869, incorporated herein by reference. It has been found that numerous new metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e. from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 30 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Mich., under the "Primacor" designation. These high acid base copolymers exhibit the typical properties set forth below in Table 1.

hydroxide, magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

As indicated below in Table 2 and more specifically in the Examples in U.S. Pat. No. 5,688,869 a number of new types of metal cation neutralized high acid ionomers can be obtained from the above indicated process. These include new high acid ionomer resins neutralized to various extents with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high acid ionomer resins neutralized with cations such as sodium, potassium, lithium, zinc, magnesium, manganese, calcium and nickel, several new cation neutralized acrylic acid based high acid ionomer resins are produced.

TABLE 1

Typical Properties of Primacor Ethylene-Acrylic Acid Copolymers

| GRADE | PERCENT ACID | DENSITY, g/cc | MELT INDEX, g/10 min | TENSILE YD. ST (psi) | FLEXURAL MODULUS (psi) | VICAT SOFT PT (° C.) | SHORE D HARDNESS |
|---|---|---|---|---|---|---|---|
| ASTM |  | D-792 | D-1238 | D-638 | D-790 | D-1525 | D-2240 |
| 5980 | 20.0 | 0.958 | 300.0 | — | 4800 | 43 | 50 |
| 5990 | 20.0 | 0.955 | 1300.0 | 650 | 2600 | 40 | 42 |
| 5990 | 20.0 | 0.955 | 1300.0 | 650 | 3200 | 40 | 42 |
| 5981 | 20.0 | 0.960 | 300.0 | 900 | 3200 | 46 | 48 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2600.0 | 635 | 2600 | 38 | 40 |

[1] The Melt Index values are obtained according to ASTM D-1238, at 190° C.

Due to the high molecular weight of the Primacor 5981 grade of the ethylene-acrylic acid copolymer, this copolymer is the more preferred grade utilized in the invention.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium

TABLE 2

| Formulation No. | Wt-% Cation Salt | Wt-% Neutralization | Melt Index | C.O.R. | Shore D Hardness |
|---|---|---|---|---|---|
| 1(NaOH) | 6.98 | 67.5 | 0.9 | .804 | 71 |
| 2(NaOH) | 5.66 | 54.0 | 2.4 | .808 | 73 |
| 3(NaOH) | 3.84 | 35.9 | 12.2 | .812 | 69 |
| 4(NaOH) | 2.91 | 27.0 | 17.5 | .812 | (brittle) |
| 5(MnAc) | 19.6 | 71.7 | 7.5 | .809 | 73 |
| 6(MnAc) | 23.1 | 88.3 | 3.5 | .814 | 77 |
| 7(MnAc) | 15.3 | 53.0 | 7.5 | .810 | 72 |
| 8(MnAc) | 26.5 | 106 | 0.7 | .813 | (brittle) |
| 9(LiOH) | 4.54 | 71.3 | 0.6 | .810 | 74 |
| 10(LiOH) | 3.38 | 52.5 | 4.2 | .818 | 72 |
| 11(LiOH) | 2.34 | 35.9 | 18.6 | .815 | 72 |
| 12(KOH) | 5.30 | 36.0 | 19.3 | Broke | 70 |
| 13(KOH) | 8.26 | 57.9 | 7.18 | .804 | 70 |
| 14(KOH) | 10.7 | 77.0 | 4.3 | .801 | 67 |
| 15(ZnAc) | 17.9 | 71.5 | 0.2 | .806 | 71 |

TABLE 2-continued

| Formulation No. | Wt-% Cation Salt | Wt-% Neutralization | Melt Index | C.O.R. | Shore D Hardness |
|---|---|---|---|---|---|
| 16(ZnAc) | 13.9 | 53.0 | 0.9 | .797 | 69 |
| 17(ZnAc) | 9.91 | 36.1 | 3.4 | .793 | 67 |
| 18(MgAc) | 17.4 | 70.7 | 2.8 | .814 | 74 |
| 19(MgAc) | 20.6 | 87.1 | 1.5 | .815 | 76 |
| 20(MgAc) | 13.8 | 53.8 | 4.1 | .814 | 74 |
| 21(CaAc) | 13.2 | 69.2 | 1.1 | .813 | 74 |
| 22(CaAc) | 7.12 | 34.9 | 10.1 | .808 | 70 |
| 23(MgO) | 2.91 | 53.5 | 2.5 | .813 | |
| 24(MgO) | 3.85 | 71.5 | 2.8 | .808 | |
| 25(MgO) | 4.76 | 89.3 | 1.1 | .809 | |
| 26(MgO) | 1.96 | 35.7 | 7.5 | .815 | |
| 27(NiAc) | 13.04 | 61.1 | 0.2 | .802 | 71 |
| 28(NiAc) | 10.71 | 48.9 | 0.5 | .799 | 72 |
| 29(NiAc) | 8.26 | 36.7 | 1.8 | .796 | 69 |
| 30(NiAc) | 5.66 | 24.4 | 7.5 | .786 | 64 |

Controls:
50/50 Blend of Ioteks 8000/7030 C.O.R. = .810/65 Shore D Hardness
DuPont High Acid Surlyn ® 8422 (Na) C.O.R. = .811/70 Shore D Hardness
DuPont High Acid Surlyn ® 8162 (Zn) C.O.R. = .807/65 Shore D Hardness
Exxon High Acid Iotek EX-960 (Zn) C.O.R. = .796/65 Shore D Hardness
Control for Formulations 23–26 is 50/50 Iotek 8000/7030, C.O.R. = .814, Formulation 26 C.O.R. was normalized to that control accordingly
Control for Formulation Nos. 27–30 is 50/50 Iotek 8000/7030, C.O.R. = .807

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field of golf ball manufacturing.

When utilized in the construction of the inner layer of a multi-layered golf ball, it has been found that the new acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451.

Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for production of an inner cover layer of a multi-layered golf ball. By using these high acid ionomer resins, harder, stiffer inner cover layers having higher C.O.R.'s, and thus longer distance, can be obtained.

More preferably, it has been found that when two or more of the above-indicated high acid ionomers, particularly blends of sodium and zinc high acid ionomers, are processed to produce the covers of multi-layered golf balls, (i.e., the inner cover layer herein) the resulting golf balls will travel further than previously known multi-layered golf balls produced with low acid ionomer resin covers due to the balls' enhanced coefficient of restitution values.

With respect to the outer layer of the multi-layered cover of the present invention, the outer cover layer is comparatively softer than the high acid ionomer based inner layer. The softness provides for the feel and playability characteristics typically associated with balata or balata-blend balls. The outer layer or ply is comprised of a relatively soft, low modulus (about 1,000 psi to about 10,000 psi) and low acid (less than 16 weight percent acid) ionomer, ionomer blend or a non-ionomeric thermoplastic elastomer such as, but not limited to, a polyurethane, a polyester elastomer such as that marketed by DuPont under the trademark Hytrel®, or a polyether amide such as that marketed by Elf Atochem S.A. under the trademark Pebax®. The outer layer is fairly thin (i.e. from about 0.010 to about 0.050 in thickness, more desirably about 0.03 inches in thickness for a 1.680 inch ball), but thick enough to achieve desired playability characteristics while minimizing expense.

Preferably, the outer layer includes a blend of hard and soft (low acid) ionomer resins such as those described in U.S. Pat. Nos. 4,884,814 and 5,120,791, both incorporated herein by reference. Specifically, a desirable material for use in molding the outer layer comprises a blend of a high modulus (hard) ionomer with a low modulus (soft) ionomer to form a base ionomer mixture. A high modulus ionomer herein is one which measures from about 15,000 to about 70,000 psi as measured in accordance with ASTM method D-790. The hardness may be defined as at least 50 on the Shore D scale as measured in accordance with ASTM method D-2240. This is described in greater detail herein.

A low modulus ionomer suitable for use in the outer layer blend has a flexural modulus measuring from about 1,000 to about 10,000 psi, with a hardness of about 20 to about 40 on the Shore D scale.

The hard ionomer resins utilized to produce the outer cover layer composition hard/soft blends include ionic copolymers which are the sodium, zinc, magnesium or lithium salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15–75 percent) neutralized.

The hard ionomeric resins are likely copolymers of ethylene and either acrylic and/or methacrylic acid, with copolymers of ethylene and acrylic acid being the most preferred. Two or more types of hard ionomeric resins may be blended into the outer cover layer compositions in order to produce the desired properties of the resulting golf balls.

As discussed earlier herein, the hard ionomeric resins introduced under the designation Escor® and sold under the designation "Iotek" are somewhat similar to the hard ionomeric resins sold under the Surlyn® trademark. However, since the "Iotek" ionomeric resins are sodium or zinc salts of poly(ethylene-acrylic acid) and the Surlyn® resins are zinc or sodium salts of poly(ethylene-methacrylic acid) some distinct differences in properties exist. As more specifically indicated in the data set forth below, the hard "Iotek" resins (i.e., the acrylic acid based hard ionomer resins) are the more preferred hard resins for use in formulating the outer layer blends for use in the present invention. In addition, various blends of "Iotek" and Surlyn® hard ionomeric resins, as well as other available ionomeric resins, may be utilized in the present invention in a similar manner.

Examples of commercially available hard ionomeric resins which may be used in the present invention in formulating the outer cover blends include the hard sodium ionic copolymer sold under the trademark Surlyn® 8940 and the hard zinc ionic copolymer sold under the trademark Surlyn® 9910. Surlyn® 8940 is a copolymer of ethylene with methacrylic acid and about 15 weight percent acid which is about 29 percent neutralized with sodium ions. This resin has an average melt flow index of about 2.8. Surlyn® 9910 is a copolymer of ethylene and methacrylic acid with about 15 weight percent acid which is about 58 percent neutralized with zinc ions. The average melt flow index of Surlyn® 9910 is about 0.7. The typical properties of Surlyn® 9910 and 8940 are set forth below in Table 3:

TABLE 3

Typical Properties of Commercially Available Hard
Surlyn ® Resins Suitable for Use in the Outer Layer Blends of
the Present Invention

|  | ASTM D | 8940 | 9910 | 8920 | 8528 | 9970 | 9730 |
|---|---|---|---|---|---|---|---|
| Cation Type |  | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific Gravity, g/cm³ | D-792 | 0.95 | 0.97 | 0.95 | 0.94 | 0.95 | 0.95 |
| Hardness, Shore D | D-2240 | 66 | 64 | 66 | 60 | 62 | 63 |
| Tensile Strength, (kpsi), MPa | D-638 | (4.8) 33.1 | (3.6) 24.8 | (5.4) 37.2 | (4.2) 29.0 | (3.2) 22.0 | (4.1) 28.0 |
| Elongation, % | D-638 | 470 | 290 | 350 | 450 | 460 | 460 |
| Flexural Modulus, (kpsi) MPa | D-790 | (51) 350 | (48) 330 | (55) 380 | (32) 220 | (28) 190 | (30) 210 |
| Tensile Impact (23° C.) KJ/m₂(ft.-lbs./in²) | D-1822S | 1020 (485) | 1020 (485) | 865 (410) | 1160 (550) | 760 (360) | 1240 (590) |
| Vicat Temperature, ° C. | D-1525 | 63 | 62 | 58 | 73 | 61 | 73 |

Examples of the more pertinent acrylic acid based hard ionomer resin suitable for use in the present outer cover composition sold under the "Iotek" tradename by the Exxon Corporation include Iotek 4000, Iotek 4010, Iotek 8000, Iotek 8020 and Iotek 8030. The typical properties of these and other Iotek hard ionomers suited for use in formulating the outer layer cover composition are set forth below in Table 4:

TABLE 4

Typical Properties of Iotek Ionomers

|  | ASTM Method | Units | 4000 | 4010 | 8000 | 8020 | 8030 |
|---|---|---|---|---|---|---|---|
| Resin Properties |  |  |  |  |  |  |  |
| Cation type |  |  | zinc | zinc | sodium | sodium | sodium |
| Melt index | D-1238 | g/10 min. | 2.5 | 1.5 | 0.8 | 1.6 | 2.8 |
| Density | D-1505 | kg/m³ | 963 | 963 | 954 | 960 | 960 |
| Melting Point | D-3417 | ° C. | 90 | 90 | 90 | 87.5 | 87.5 |
| Crystallization Point | D-3417 | ° C. | 62 | 64 | 56 | 53 | 55 |
| Vicat Softening Point | D-1525 | ° C. | 62 | 63 | 61 | 64 | 67 |
| % Weight Acrylic Acid |  |  |  |  | 16 |  | 11 |
| % of Acid Groups cation neutralized |  |  |  |  | 30 |  | 40 |
| Plaque Properties (3 mm thick, compression molded) |  |  |  |  |  |  |  |
| Tensile at break | D-638 | MPa | 24 | 26 | 36 | 31.5 | 28 |
| Yield point | D-638 | MPa | none | none | 21 | 21 | 23 |
| Elongation at break | D-638 | % | 395 | 420 | 350 | 410 | 395 |
| 1% Secant modulus | D-638 | MPa | 160 | 160 | 300 | 350 | 390 |
| Shore Hardness D | D-2240 | — | 55 | 55 | 61 | 58 | 59 |
| Film Properties (50 micron film 2.2:1 Blow-up ratio) |  |  |  |  |  |  |  |
| Tensile at Break MD | D-882 | MPa | 41 | 39 | 42 | 52 | 47.4 |
| TD | D-882 | MPa | 37 | 38 | 38 | 38 | 40.5 |
| Yield point MD | D-882 | MPa | 15 | 17 | 17 | 23 | 21.6 |
| TD | D-882 | MPa | 14 | 15 | 15 | 21 | 20.7 |
| Elongation at Break MD | D-882 | % | 310 | 270 | 260 | 295 | 305 |
| TD | D-882 | % | 360 | 340 | 280 | 340 | 345 |
| 1% Secant modulus MD | D-882 | MPa | 210 | 215 | 390 | 380 | 380 |
| TD | D-882 | MPa | 200 | 225 | 380 | 350 | 345 |
| Dart Drop Impact | D-1709 | g/micron | 12.4 | 12.5 | 20.3 |  |  |

|  | ASTM Method | Units | 7010 | 7020 | 7030 |
|---|---|---|---|---|---|
| Resin Properties |  |  |  |  |  |
| Cation type |  |  | zinc | zinc | zinc |
| Melt Index | D-1238 | g/10 min. | 0.8 | 1.5 | 2.5 |
| Density | D-1505 | kg/m³ | 960 | 960 | 960 |

TABLE 4-continued

Typical Properties of Iotek Ionomers

| Melting Point | D-3417 | °C. | 90 | 90 | 90 |
|---|---|---|---|---|---|
| Crystallization Point | D-3417 | °C. | — | — | — |
| Vicat Softening Point | D-1525 | °C. | 60 | 63 | 62.5 |
| % Weight Acrylic Acid | | — | — | — | — |
| % of Acid Groups Cation Neutralized | | — | — | — | — |
| Plaque Properties (3 mm thick, compression molded) | | | | | |
| Tensile at break | D-638 | MPa | 38 | 38 | 38 |
| Yield Point | D-638 | MPa | none | none | none |
| Elongation at break | D-638 | % | 500 | 420 | 395 |
| 1% Secant modulus | D-638 | MPa | — | — | — |
| Shore Hardness D | D-2240 | — | 57 | 55 | 55 |

Comparatively, soft ionomers are used in formulating the hard/soft blends of the outer cover composition. These ionomers include acrylic acid based soft ionomers. They are generally characterized as comprising sodium or zinc salts of a terpolymer of an olefin having from about 2 to 8 carbon atoms, acrylic acid, and an unsaturated monomer of the acrylate ester class having from 1 to 21 carbon atoms. The soft ionomer is preferably a zinc based ionomer made from an acrylic acid base polymer in an unsaturated monomer of the acrylate ester class. The soft (low modulus) ionomers have a hardness from about 20 to about 40 as measured on the Shore D scale and a flexural modulus from about 1,000 to about 10,000, as measured in accordance with ASTM method D-790.

Certain ethylene-acrylic acid based soft ionomer resins developed by the Exxon Corporation under the designation "Iotek 7520" (referred to experimentally by differences in neutralization and melt indexes as LDX 195, LDX 196, LDX 218 and LDX 219) may be combined with known hard ionomers such as those indicated above to produce the outer cover. The combination produces higher C.O.R.'s at equal or softer hardness, higher melt flow (which corresponds to improved, more efficient molding, i.e., fewer rejects) as well as significant cost savings versus the outer layer of multi-layer balls produced by other known hard-soft ionomer blends as a result of the lower overall raw materials costs and improved yields.

While the exact chemical composition of the resins to be sold by Exxon under the designation Iotek 7520 is considered by Exxon to be confidential and proprietary information, Exxon's experimental product data sheet lists the following physical properties of the ethylene acrylic acid zinc ionomer developed by Exxon:

TABLE 5

| Property | ASTM Method | Units | Typical Value |
|---|---|---|---|
| Physical Properties of Iotek 7520 | | | |
| Melt Index | D-1238 | g/10 min. | 2 |
| Density | D-1505 | kg/m³ | 0.962 |
| Cation | | | Zinc |
| Melting Point | D-3417 | °C. | 66 |
| Crystallization Point | D-3417 | °C. | 49 |
| Vicat Softening Point | D-1525 | °C. | 42 |

TABLE 5-continued

| Property | ASTM Method | Units | Typical Value |
|---|---|---|---|
| Plague Properties (2 mm thick Compression Molded Plaques) | | | |
| Tensile at Break | D-638 | MPa | 10 |
| Yield Point | D-638 | MPa | None |
| Elongation at Break | D-638 | % | 760 |
| 1% Secant Modulus | D-638 | MPa | 22 |
| Shore D Hardness | D-2240 | | 32 |
| Flexural Modulus | D-790 | MPa | 26 |
| Zwick Rebound | ISO 4862 | % | 52 |
| De Mattia Flex Resistance | D-430 | Cycles | >5000 |

In addition, Iotek 7520 resins have Shore D hardnesses of about 32 to 36 (per ASTM D-2240), melt flow indexes of 3±0.5 g/10 min (at 190° C. per ASTM D-1288), and a flexural modulus of about 2500–3500 psi (per ASTM D-790). Furthermore, testing by an independent testing laboratory by pyrolysis mass spectrometry indicates that Iotek 7520 resins are generally zinc salts of a terpolymer of ethylene, acrylic acid, and methyl acrylate.

Furthermore, a newly developed grade of an acrylic acid based soft ionomer available from the Exxon Corporation under the designation Iotek 7510, is also effective, when combined with the hard ionomers indicated above in producing golf ball covers exhibiting higher C.O.R. values at equal or softer hardness than those produced by known hard-soft ionomer blends. In this regard, Iotek 7510 has the advantages (i.e. improved flow, higher C.O.R. values at equal hardness, increased clarity, etc.) produced by the Iotek 7520 resin when compared to the methacrylic acid base soft ionomers known in the art (such as the Surlyn® 8625 and the Surlyn® 8629 combinations disclosed in U.S. Pat. No. 4,884,814).

In addition, Iotek 7510, when compared to Iotek 7520, produces slightly higher C.O.R. values at equal softness/hardness due to the Iotek 7510's higher hardness and neutralization. Similarly, Iotek 7510 produces better release properties (from the mold centers) due to its slightly higher stiffness and lower flow rate than Iotek 7520. This is important in production where the soft covered balls tend to have lower yields caused by sticking in the molds and subsequent punched pin marks from the knockouts.

According to Exxon, Iotek 7510 is of similar chemical composition as Iotek 7520 (i.e. a zinc salt of a terpolymer of ethylene, acrylic acid, and methyl acrylate) but is more highly neutralized. Based upon FTIR analysis, Iotek 7520 is estimated to be about 30–40 wt.-% neutralized and Iotek 7510 is estimated to be about 40–60 wt.-% neutralized. The typical properties of Iotek 7510 in comparison of those of Iotek 7520 are set forth below:

TABLE 6

Physical Properties of Iotek 7510 in Comparison to Iotek 7520

|  | IOTEK 7520 | IOTEK 7510 |
|---|---|---|
| MI, g/10 min | 2.0 | 0.8 |
| Density, g/cc | 0.96 | 0.97 |
| Melting Point, ° F. | 151 | 149 |
| Vicat Softening Point, ° F. | 108 | 109 |
| Flex Modulus, psi | 3800 | 5300 |
| Tensile Strength, psi | 1450 | 1750 |
| Elongation, % | 760 | 690 |
| Hardness, Shore D | 32 | 35 |

It has been determined that when hard/soft ionomer blends are used for the outer cover layer, good results are achieved when the relative combination is in a range of about 90 to about 10 percent hard ionomer and about 10 to about 90 percent soft ionomer. The results are improved by adjusting the range to about 75 to 25 percent hard ionomer and 25 to 75 percent soft ionomer. Even better results are noted at relative ranges of about 60 to 90 percent hard ionomer resin and about 40 to 10 percent soft ionomer resin.

Specific formulations which may be used in the cover composition are included in the examples set forth in U.S. Pat. No. 5,120,791 and 4,884,814. The present invention is in no way limited to those examples.

Moreover, in alternative embodiments, the outer cover layer formulation may also comprise a soft, low modulus non-ionomeric thermoplastic elastomer including a polyester polyurethane such as B.F.Goodrich Company's Estane® polyester polyurethane X-4517. According to B.F.Goodrich, Estane® X-4517 has the following properties:

| Properties of Estane ® X-4517 | |
|---|---|
| Tensile | 1430 |
| 100% | 815 |
| 200% | 1024 |
| 300% | 1193 |
| Elongation | 641 |
| Youngs Modulus | 1826 |
| Hardness A/D | 88/39 |
| Bayshore Rebound | 59 |
| Solubility in Water | Insoluble |
| Melt processing temperature | >350° F. (>177° C.) |
| Specific Gravity ($H_2O$ = 1) | 1.1–1.3 |

Other soft, relatively low modulus non-ionomeric thermoplastic elastomers may also be utilized to produce the outer cover layer as long as the non-ionomeric thermoplastic elastomers produce the playability and durability characteristics desired without adversely effecting the enhanced travel distance characteristic produced by the high acid ionomer resin composition. These include, but are not limited to, thermoplastic polyurethanes such as: TEXIN® thermoplastic polyurethanes from Mobay Chemical Co. and the PEL-LETHANE® thermoplastic polyurethanes from Dow Chemical Co.; Ionomer/rubber blends such as those in Spalding U.S. Pat. Nos. 4,986,545; 5,098,105 and 5,187,013; and, Hytrel® polyester elastomers from DuPont and Pebax® polyether amides from Elf Atochem S.A.

In the following discussion, reference is made to Riehle Compression. Applicant utilizes a modified Riehle Compression Machine originally produced by Riehle Bros. Testing Machine Company, Philadelphia, Pa. to evaluate compression of the various components (i.e., cores, mantle cover balls, finished balls, etc.) of the golf balls. The Riehle compression device determines deformation in thousandths of an inch under a load designed to emulate the 200 pound spring constant of the Atti or PGA compression testers. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression=160–Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Furthermore, several references to Shore D hardness are made herein. "Shore D hardness" of a cover is measured generally in accordance with ASTM D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

The present invention is further illustrated by the following example. It is to be understood that the present invention is not limited to the example, and various changes and modifications may be made in the invention without departing from the spirit and scope thereof.

EXAMPLE

Golf balls having traditional cores and protrusion centers were formed. Particularly, two types of golf balls were formed: a Top-Flite Z Balata golf ball and a Top-Flite XL golf ball. Top-Flite Z Balata golf balls were formed having the following centers: (1) a control having a spherical core without protrusions; (2) an angular protrusion center having a protrusion height of 0.040 inches; (3) an angular protrusion center having a protrusion height of 0.060 inches; (4) a spherical protrusion center having a protrusion height of 0.060 inches; and (5) a stepped protrusion center having a protrusion height of 0.060 inches. Top-Flite XL golf balls were formed having the following centers: (1) a control having a spherical core without protrusions; (2) an angular protrusion center having a protrusion height of 0.040 inches; and (3) an angular protrusion center having a protrusion height of 0.060 inches. Table 7 below shows the core compression for each golf ball:

TABLE 7

| GOLF BALL | PROTRUSION HEIGHT (INCHES) | RIEHLE COMPRESSION |
|---|---|---|
| Z Balata Control | — | 95 |
| Z Balata Angular | 0.040 | 130 |
| Z Balata Angular | 0.060 | 140 |
| Z Balata Spherical | 0.060 | 120 |
| Z Balata Stepped | 0.060 | 140 |
| XL Control | — | 75 |
| XL Angular | 0.040 | 95 |
| XL Angular | 0.060 | 110 |

All finished golf balls having a protrusion center exhibited increased Riehle compression readings as compared to the respective control balls.

The invention has been described with reference to the preferred embodiments. Obviously, modifications and alterations will occur to others upon reading and understanding the proceeding detailed description. It is intended that the invention be construed as including all such modifications and alterations insofar as they come within the scope of the claims or the equivalents thereof.

What is claimed is:

1. A method for making a golf ball comprising the steps of:

forming a plurality of protrusion depressions on an inner surface of a mold, the protrusion depressions having a width of from about 0.09 to about 0.18 inches and a depth of about 0.02 to about 0.06 inches;

molding a core having a plurality of outwardly extending protrusions from the mold; and molding a cover about the core having the plurality of outwardly extending protrusions to thereby obtain a golf ball.

2. A method according to claim 1, wherein the step of molding the core is performed by utilizing two molds each defining a concave molding surface having a plurality of protrusion depressions on the molding surfaces.

3. A method according to claim 1, wherein the step of molding the core is performed by a compression molding operation at a temperature of from about 290° F. to about 330° F., under a pressure of about 100 to about 500 psi.

4. A method according to claim 1, wherein the plurality of protrusion depressions are selected from the group consisting of convex, angled, and stepped.

5. A method according to claim 1, wherein the step of forming the plurality of protrusion depressions is performed by a technique selected from the group consisting of drilling, end milling, grinding with a cutting tool, and using an electrical discharge machine.

6. A method according to claim 1, wherein the step of molding the cover about the core includes a first operation of molding an inner cover layer about the core and a second operation of molding an outer cover layer about the inner cover layer.

* * * * *